(12) United States Patent
Hashimoto et al.

(10) Patent No.: US 8,718,832 B2
(45) Date of Patent: May 6, 2014

(54) WIND FARM CONTROL SYSTEM, WIND FARM, AND WIND FARM CONTROL METHOD

(75) Inventors: Masayuki Hashimoto, Tokyo (JP); Hisanobu Shinoda, Tokyo (JP); Tsuyoshi Wakasa, Tokyo (JP); Akira Yasugi, Tokyo (JP); Takumi Nakashima, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 280 days.

(21) Appl. No.: 13/194,139

(22) Filed: Jul. 29, 2011

(65) Prior Publication Data

US 2012/0104755 A1    May 3, 2012

Related U.S. Application Data

(60) Provisional application No. 61/409,580, filed on Nov. 3, 2010.

(30) Foreign Application Priority Data

Oct. 29, 2010  (JP) ................................ 2010-244066

(51) Int. Cl.
*G05D 11/00*   (2006.01)
(52) U.S. Cl.
USPC ................................ 700/287; 290/44; 361/20
(58) Field of Classification Search
USPC ................................ 700/287; 290/44; 361/20
See application file for complete search history.

(56) References Cited

U.S. PATENT DOCUMENTS

| 7,528,496 B2 | 5/2009 | Fortmann |
| 2003/0227172 A1* | 12/2003 | Erdman et al. ................. 290/44 |

(Continued)

FOREIGN PATENT DOCUMENTS

| JP | 11-069893 A | 3/1999 |
| JP | 2000-166096 A | 6/2000 |
| JP | 2009-303355 A | 12/2009 |

OTHER PUBLICATIONS

International Search Report for PCT/JP2010/070295 mailed Jan. 11, 2011.

(Continued)

*Primary Examiner* — Mohammad Ali
*Assistant Examiner* — Anthony Whittington
(74) *Attorney, Agent, or Firm* — Benjamin J. Hauptman; Manabu Kanesaka

(57) ABSTRACT

To prevent disconnection of wind turbine generators due to changes in wind conditions even if the wind turbine generators is operated to limit the power output. A plurality of wind turbine generators that generate electric power by the rotation of rotors are provided in a wind farm are interconnected and are operated while the power outputs are limited in advance so as to be able to further supply electric power to a utility grid in response to a decrease in the frequency or voltage of the utility grid. The rotational speed of the rotor, which is a physical quantity related to increase and decrease in the power output of the wind turbine generator, is measured for each of the wind turbine generators by a wind-turbine control system, and the limitation amount of the power output of the wind turbine generator is set for each of the wind turbine generators by a central control system on the basis of the rotational speed of the rotor measured.

11 Claims, 9 Drawing Sheets

(56) References Cited

U.S. PATENT DOCUMENTS

2006/0132994 A1* 6/2006 Delmerico et al. ............. 361/20
2007/0085343 A1* 4/2007 Fortmann ........................ 290/44
2010/0060001 A1* 3/2010 Gabrys .......................... 290/44
2010/0067526 A1* 3/2010 Lovmand ...................... 370/389
2010/0140939 A1* 6/2010 Scholte-Wassink et al. ... 290/44
2011/0137474 A1* 6/2011 Larsen et al. ................. 700/287
2011/0153096 A1* 6/2011 Pal et al. ....................... 700/287

OTHER PUBLICATIONS

Decision to Grant a Patent mailed Nov. 19, 2013, corresponds to Japanese patent application No. 2010-244066.

* cited by examiner

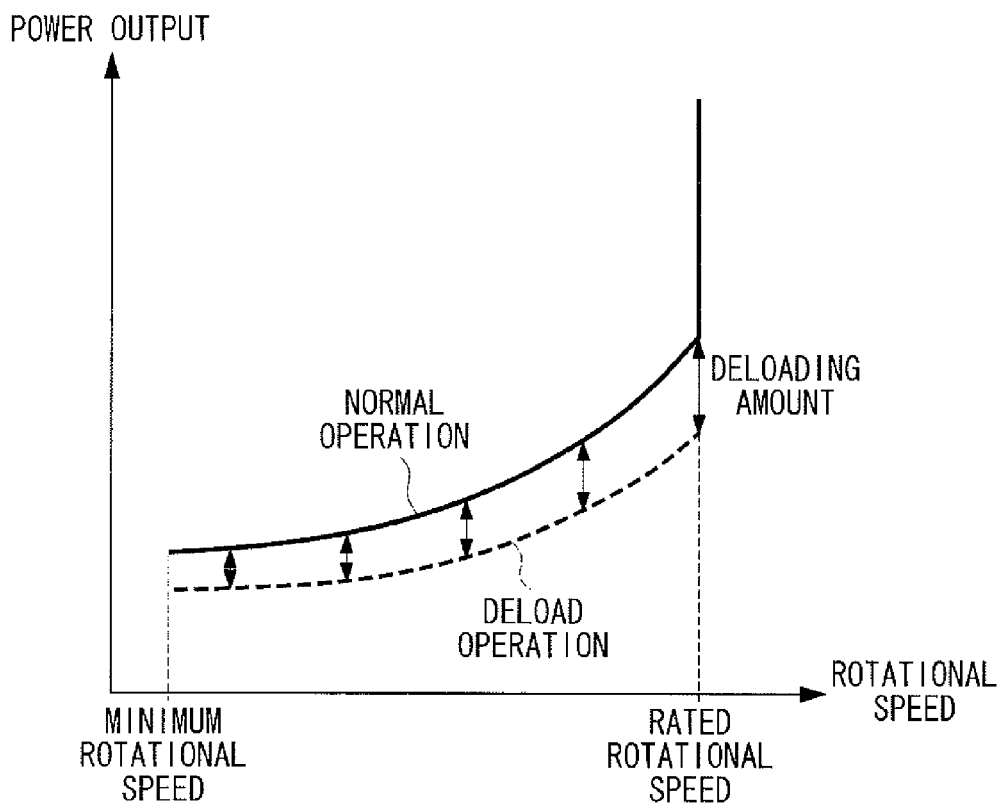

FIG. 3B

| WIND SPEED [m/s] | DELOADING AMOUNT [%] |
|---|---|
| 3 | 4 |
| 3.5 | 6 |
| 4 | 8 |
| 4.5 | 10 |
| 5 | 12 |
| 5.5 | 14 |
| 6 | 16 |
| 6.5 | 18 |
| ⋮ | ⋮ |

FIG. 3C

| ROTATIONAL SPEED \ POWER OUTPUT | 100 | 200 | 300 | ⋯ |
|---|---|---|---|---|
| 900 | 4 | 6 | 8 | |
| 950 | 6 | 8 | 10 | |
| 1050 | 8 | 10 | 12 | ⋅ |
| 1100 | 10 | 12 | 14 | ⋅ |
| 1150 | 12 | 14 | 16 | ⋅ |
| 1200 | 14 | 16 | 18 | |
| ⋮ | ⋮ | ⋮ | ⋮ | |

WIND FARM CONTROL SYSTEM, WIND FARM, AND WIND FARM CONTROL METHOD

RELATED APPLICATION

This application claims the benefit of U.S. Provisional Application No. 61/409,580, filed Nov. 3, 2010, the content of which is incorporated herein by reference. This application claims benefit of Japanese Patent Application No. 2010-244066 filed in Japan on Oct. 29, 2010, the content of which is incorporated herein by reference.

TECHNICAL FIELD

The present invention relates to a wind farm control system, a wind farm, and a wind farm control method.

BACKGROUND ART

In recent years, there has been a demand for interconnected wind turbine generators to contribute to a reduction of frequency fluctuations in a utility grid within a predetermined time (for example, within 30 seconds) from the occurrence of a disturbance in the utility grid (primary frequency response, hereinafter referred to as "PFR").

To support the PFR, Patent Literature 1 describes further supplying the power output of wind turbine generators to a utility grid when the frequency of the utility grid has decreased.

More specifically, the following kinds of operation and control for wind turbine generators are available.

An example of a method for ensuring the power output of the wind turbine generators to be supplied to the utility grid at the occurrence of the disturbance described above is an operation that limits the power output of the wind turbine generators in advance in normal operation (deload operation). However, since the deload operation outputs limited electric power, the amount of power generated by the wind turbine generators decreases.

Another method is control (inertia control) that uses inertial energy (also referred to as inertia) stored in the rotors of the wind turbine generators as electric power to be supplied to the utility grid at the occurrence of the disturbance described above. However, since the inertial energy of the rotors is lost due to the inertia control, the inertia control sharply decreases the rotational speed of the rotors to cause, for example, unnecessary disconnection of the wind turbine generators, thus raising the possibility of decreasing the power generated.

The inertia control can reduce the limitation amount of power output in the deload operation (hereinafter referred to as "deloading amount"). On the other hand, the deload operation can reduce the amount of inertial energy to be lost due to the inertia control (hereinafter referred to as "the amount of inertia used") by increasing the deloading amount.

CITATION LIST

Patent Literature

{PTL 1} U.S. Pat. No. 7,528,496

SUMMARY OF INVENTION

Technical Problem

Here, for the case where a plurality of wind turbine generators constitute a wind farm, a conceivable method provides the same command value (a command value for the entire wind farm or a mean value obtained by dividing the command values by the number of wind turbine generators) to the individual wind turbine generators as the limitation amount of power output in the deload operation (hereinafter referred to as a "deloading amount") and the amount of inertial energy lost due to the inertia control (hereinafter referred to as "the amount of inertia used").

However, wind conditions for the plurality of wind turbine generators are not the same. Therefore, for example, in the case where the same ratio of deloading amount is required for the power output of a wind turbine generator operated when receiving a strong wind and a wind turbine generator operated when receiving a weak wind in the wind farm, when the wind becomes weaker, that is, when the wind speed decreases to reduce the wind energy, energy to be generated from the wind turbine generator operated when receiving the weak wind exceeds the wind energy, and as a result, the rotational speed of the rotor may decrease to pose the possibility that the rotation of the rotor cannot be maintained. Furthermore, the inertial energy of the wind turbine generator operated when receiving the weak wind may be lost due to the inertia control, which poses the possibility that the rotation of the rotor cannot be maintained, as shown in FIG. 9.

As a result, the wind turbine generator is disconnected, which decreases the active power and reactive power adjusting capability (capacity) of the wind farm. Furthermore, the wind turbine generator, when disconnected, takes time (from several minutes to several tens of minutes) to restart; therefore, the wind farm may not cope with a case in which a rapid load request is issued.

The present invention has been made in consideration of such circumstances, and an object thereof is to provide a wind farm control system, a wind farm, and a wind farm control method capable of preventing disconnection of wind turbine generators due to changes in wind conditions by setting a deloading amount and the amount of inertia used even if the wind turbine generators are operated to limit the power output.

Solution to Problem

A wind farm control system, a wind farm, and a wind farm control method of the present invention adopt the following solutions to solve the problems described above.

That is, a wind farm control system according to a first aspect of the present invention is a control system for a wind farm including a plurality of wind turbine generators that generate electric power by the rotation of rotors, in which the wind turbine generators are interconnected and are operated while power outputs thereof are limited in advance so as to be able to further supply electric power to a utility grid in response to a decrease in the frequency or voltage of the utility grid, the wind farm control system including a measuring portion that measures, for each of the wind turbine generators, a physical quantity related to increase and decrease in the power output of the corresponding wind turbine generator; and a setting portion that sets, for each of the wind turbine generators, the limitation amount of the power output of the corresponding wind turbine generator on the basis of the physical quantity measured by the measuring portion.

According to the above aspect, the plurality of wind turbine generators that generate electric power by the rotation of rotors are provided in the wind farm, are interconnected, and are operated while power outputs thereof are limited in advance so as to be able to further supply electric power to a utility grid in response to a decrease in the frequency or voltage of the utility grid.

For each of the wind turbine generators, a physical quantity related to increase and decrease in the power output of the corresponding wind turbine generator is measured by the measuring portion. Examples of the physical quantity include the rotational speed of the rotor and a wind speed in the vicinity of the wind turbine generator. When the physical quantity increases, the power output of the wind turbine generator also increases, and when the physical quantity decreases, the power output of the wind turbine generator also decreases.

Furthermore, for each of the wind turbine generators, the limitation amount of the power output of the corresponding wind turbine generator is set by the setting portion on the basis of the physical quantity measured by the measuring portion. In other words, the limitation amount of the power output is not set uniformly for the plurality of wind turbine generators provided in the wind farm but for each of the wind turbine generators depending on increase and decrease in physical quantity, such as a rotor speed and a wind speed of each wind turbine generator.

Thus, the above aspect can prevent disconnection of the wind turbine generator due to changes in wind conditions even if the wind turbine generator operates to limit the power output.

Furthermore, the wind farm control system according to the first aspect of the present invention may be configured such that the setting portion sets the limitation amount of the power output of each wind turbine generator so that the larger the physical quantity measured by the measuring portion, the larger the limitation amount of the power output is, and the smaller the physical quantity measured by the measuring portion, the smaller the limitation amount of the power output is.

In the case where a large limitation amount relative to the power output is set for a wind turbine generator that outputs low electric power because of a small physical quantity related to increase and decrease in the power output of the wind turbine generator, when the wind speed further decreases to reduce wind energy, energy to be generated therefrom exceeds the wind energy, and as a result, the rotational speed of the rotor may become too low, causing disconnection of the wind turbine generator.

According to the above aspect, for each of the wind turbine generators, the smaller the physical quantity related to increase and decrease in the power output of the corresponding wind turbine generator, the smaller the limitation amount of the power output is set. This can prevent the rotor speed from becoming too low because the limitation amount is set, thereby preventing disconnection of the wind turbine generator. On the other hand, the larger the physical quantity, the larger the limitation amount of the power output is set. This can further increase the amount of electric power to be supplied to the utility grid in accordance with a decrease in frequency or voltage of the utility grid.

Furthermore, the wind farm control system according to the first aspect of the present invention may be configured such that the wind turbine generators are controlled so that, when the utility grid decreases in frequency or voltage, the wind turbine generators further supply electric power to the utility grid by using the inertial energy of the rotors; and the setting portion sets, for each of the wind turbine generators, the limitation amount of the power output so as to be small as compared with a case in which the inertial energy of the corresponding rotor is not used, depending on the power output obtained by the inertial energy of the corresponding rotor.

According to the above aspect, for each of the wind turbine generators controlled so that, when the utility grid decreases in frequency or voltage, the wind turbine generators further supply electric power to the utility grid by using the inertial energy of the rotors, the limitation amount of the power output is set so as to be small as compared with a case in which the inertial energy of the corresponding rotor is not used, depending on the power output obtained using the inertial energy of the rotor.

Thus, in the above aspect, since the limitation amount of the power output of the wind turbine generator that further supplies electric power to the utility grid by using the inertial energy of the rotor can be reduced, the power output of the wind turbine generator when no disturbance has occurred in the utility grid can be increased further.

Furthermore, the wind farm control system according to the first aspect of the present invention may be configured such that the setting portion performs the setting, for each of the wind turbine generators, so that the smaller the physical quantity measured by the measuring portion, the smaller the inertial energy that is used when the utility grid decreases in frequency or voltage is and the larger the limitation amount of the power output is, and the larger the physical quantity measured by the measuring portion, the larger the inertial energy that is used when the utility grid decreases in frequency or voltage is and the smaller the limitation amount of the power output is.

When the wind turbine generator is controlled to further supply electric power to the utility grid using the inertial energy of the rotor, the inertial energy of the rotor is lost, and thus the rotor speed decreases. Therefore, in the case where the rotor speed is low, execution of the control may decrease the rotor speed too much, thus posing the possibility of disconnection of the wind turbine generator.

Thus, according to the above aspect, the setting is performed, for each of the wind turbine generators, so that the smaller the physical quantity related to increase and decrease in the power output of the corresponding wind turbine generator, the smaller the inertial energy that is used when the utility grid decreases in frequency or voltage is and the larger the limitation amount of the power output is, and the larger the physical quantity, the larger the inertial energy is and the smaller the limitation amount of the power output is.

Thus, the above aspect can prevent the wind turbine generator from being disconnected because the rotor speed decreases too much due to execution of the above control and can hold electric power that can be supplied to the utility grid constant in the case where the frequency or the voltage of the utility grid has decreased irrespective of the level of the physical quantity.

Furthermore, the wind farm control system according to the first aspect of the present invention may be configured such that the setting portion sets the rotational speed of the rotor in advance on which the control for further supplying electric power to the utility grid using the inertial energy is not performed even if the utility grid decreases in frequency or voltage.

According to the above aspect, the rotational speed of the rotor that may decrease to cause disconnection of the wind turbine generator due to execution of the control for further supplying electric power to the utility grid using the inertial energy of the rotor is set in advance. If the rotor speed of the wind turbine generator is lower than the set rotational speed, the above control is not performed.

Thus, the above aspect can prevent disconnection of the wind turbine generator.

Furthermore, the wind farm control system according to the first aspect of the present invention may be configured such that the setting portion sets the total limitation amount of the power outputs of the plurality of wind turbine generators to be kept constant irrespective of a wind speed of the wind turbine generators.

According to the above aspect, since the total limitation amount of the power outputs of the plurality of wind turbine generators are set to be kept constant irrespective of the wind speed of the wind turbine generators, the frequency or voltage of the utility grid can be restored from a decrease more reliably.

Furthermore, a wind farm according to a second aspect of the present invention includes a plurality of wind turbine generators and the control system described above.

According to the above aspect, since the wind farm including the plurality of wind turbine generators is configured such that the limitation amount of the power output of each wind turbine generator is set by the control system described above, disconnection of the wind turbine generators due to changes in wind conditions can be prevented even if the wind turbine generators are operated to limit the power output.

Furthermore, a wind farm control method according to a third aspect of the present invention is a control method for a wind farm including a plurality of wind turbine generators that generate electric power by the rotation of rotors, in which the wind turbine generators are interconnected and are operated while power outputs thereof are limited in advance so as to be able to further supply electric power to a utility grid in response to a decrease in the frequency or voltage of the utility grid, the wind farm control method including a first process of measuring, for each of the wind turbine generators, a physical quantity related to increase and decrease in the power output of the corresponding wind turbine generator; and a second process of setting, for each of the wind turbine generators, the limitation amount of the power output of the corresponding wind turbine generator on the basis of the physical quantity measured in the first process.

According to the above aspect, the limitation amount of the power output is not set uniformly for the plurality of wind turbine generators provided in the wind farm but for each of the wind turbine generators depending on increase and decrease in physical quantities, such as a rotor speed and a wind speed of each wind turbine generator.

Thus, the above aspect can prevent disconnection of the wind turbine generator due to changes in wind conditions even if the wind turbine generator operates to limit the power output.

Advantageous Effects of Invention

The present invention has an advantageous effect of preventing disconnection of a wind turbine generator due to changes in wind conditions even if the wind turbine generator operates to limit the power output.

BRIEF DESCRIPTION OF DRAWINGS

FIG. 2 is a graph showing the relationship between the rotor speed and the deloading amount according to the first embodiment of the present invention.

FIG. 3A is a schematic diagram showing tabular data for use in setting the deloading amount according to the first embodiment of the present invention, showing deloading amounts depending on the rotor speed.

FIG. 3B is a schematic diagram showing tabular data for use in setting the deloading amount according to the first embodiment of the present invention, showing deloading amounts depending on the wind speed.

FIG. 3C is a schematic diagram showing tabular data for use in setting the deloading amount according to the first embodiment of the present invention, showing deloading amounts depending on the rotor speed and the power output.

DESCRIPTION OF EMBODIMENTS

An embodiment of a wind farm control system, a wind farm, and a wind farm control method according to the present invention will be described hereinbelow with reference to the drawings.

First Embodiment

A first embodiment of the present invention will be described hereinbelow.

Figure 1:
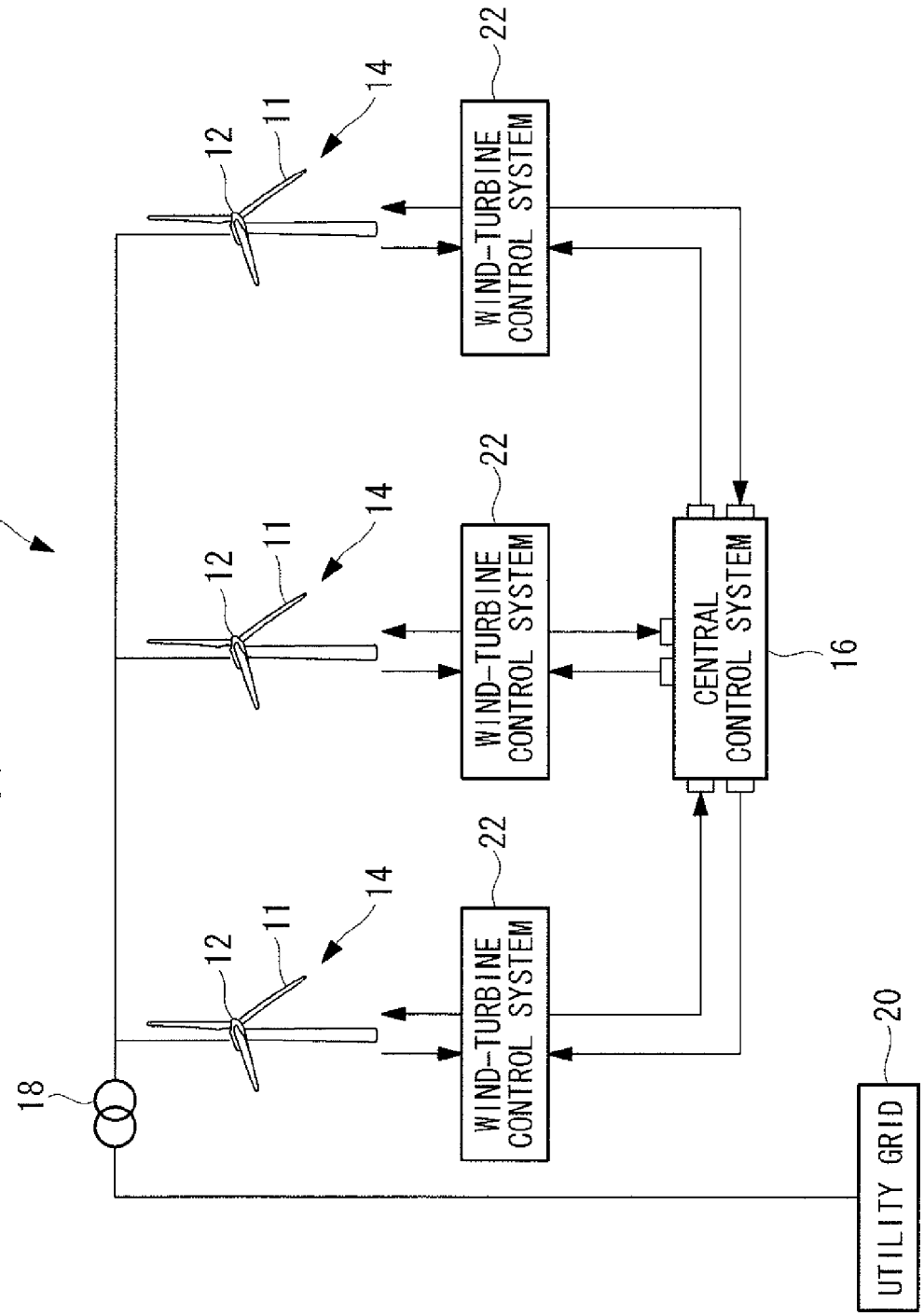
FIG. 1 a schematic diagram showing the overall configuration of a wind farm according to a first embodiment of the present invention.

FIG. 1 a diagram showing the overall configuration of a wind farm 10 according to the first embodiment of the present invention. The wind farm 10 is equipped with a plurality of wind turbine generators 14 that generate electric power by the rotation of a rotor 12 having a plurality of blades 11 and a central control system 16 that controls the entire wind farm 10 (for example, supervisory control and data acquisition (SCADA)). In the first embodiment, although the wind farm 10 is described using an example in which three wind turbine generators 14 are provided, as shown in FIG. 1, the number is not particularly limited.

The wind turbine generators 14 according to the first embodiment are interconnected via a transformer 18 and can further supply electric power to a utility grid 20 depending on a decrease in frequency caused in the utility grid 20 to allow contribution to reduction of fluctuations in the frequency of the utility grid 20 (PFR) within a predetermined time from the occurrence of a disturbance in the utility grid 20 (for example, within 30 seconds).

Furthermore, the wind turbine generators 14 are each provided with a wind-turbine control system 22.

The wind-turbine control system 22 controls the operating state of the corresponding wind turbine generator 14 and is capable of transmission and reception of various data to/from the central control system 16. The wind-turbine control system 22 can also detect fluctuations in the electric power and frequency of the utility grid 20 and measure the rotational speed of the rotor 12 of the wind turbine generator 14 (hereinafter referred to as "rotor speed").

The wind-turbine control system 22 transmits data showing the control state of the wind turbine generator 14, the rotor speed of the wind turbine generator 14, wind speed in the vicinity of the wind turbine generator 14 measured by an anemometer (not shown), the power output of the wind turbine generator 14 and so on to the central control system 16. On the other hand, the central control system 16 transmits data, such as parameters, necessary for controlling the wind turbine generator 14 to the wind-turbine control system 22. The rotor speed and the wind speed are physical quantities related to increase and decrease in the power output of the wind turbine generator 14, and if the rotor speed and the wind speed increase, the power output of the wind turbine generator 14 also increases, and if the rotor speed and the wind speed decrease, the power output of the wind turbine generator also decreases.

Next, control of the wind turbine generator 14 using the wind-turbine control system 22 will be described in more detail.

The wind-turbine control system 22 according to the first embodiment controls the wind turbine generator 14 so as to perform a deload operation in which the power output of the wind turbine generator 14 is limited in advance for the purpose of supporting the PFR of the wind turbine generator 14, that is, for the purpose of ensuring an expected increase in the reserve power output of the wind turbine generator 14 to be supplied to the utility grid 20 at the occurrence of a disturbance in the utility grid 20. An example of a method for limiting the power output is a method of decreasing the rotational speed of the rotor 12 by adjusting the pitch angle of the blades 11 of the rotor 12.

Here, the wind conditions of the plurality of wind turbine generators 14 provided in the wind farm 10 are not uniform. Therefore, in the case where the limitation amounts (deloading amounts) of the power outputs of the wind turbine generators 14 are the same for any of the plurality of wind turbine generators 14, for the wind turbine generator 14 at a low wind speed and having a low rotor speed, there is the possibility that energy to be generated exceeds wind energy due to a further decrease in wind speed and wind energy, and as a result, the rotor speed cannot reach a rotational speed for maintaining the grid connection (hereinafter referred to as "minimum rotational speed") to cause disconnection.

Thus, the central control system 16 according to the first embodiment sets the deloading amounts depending on the power outputs of the individual wind turbine generators 14.

FIG. 2 is a graph showing the relationship between the rotor speed and the deloading amount.

In FIG. 2, the horizontal axis indicates the rotor speed (rotor speed not in the deload operation), and the vertical axis indicates the power output of the wind turbine generator 14. The solid line indicates the power output of the wind turbine generator 14 in the case where an operation in which no deload operation is performed (hereinafter referred to as "normal operation") is performed, and the broken line indicates the power output of the wind turbine generator 14 during a deload operation. That is, in FIG. 4, the difference between the solid line and the broken line is the deloading amount. Therefore, the wind turbine generator 14 further supplies a power output (electric power) corresponding to the deloading amount to the utility grid 20 by shifting from the deload operation to the normal operation during PFR.

The central control system 16 according to the first embodiment sets the deloading amount, for each wind turbine generator 14, so that the higher the rotor speed, the larger the deloading amount is, and the lower the rotor speed, the smaller the deloading amount is, as shown in FIG. 2. This can prevent, in the case where a large deloading amount relative to the power output is set for the wind turbine generator 14 that generates low power due to a low rotor speed, the energy to be generated from exceeding the wind energy because the wind speed further decreases to decrease the wind energy, the rotational speed of the rotor from becoming too low, thus preventing the wind turbine generator 14 from being disconnected.

As shown in the schematic diagram of FIG. 3A, the central control system 16 stores tabular data, in advance, showing deloading amounts corresponding to rotor speeds. The central control system 16 reads deloading amounts from the tabular data depending on rotor speeds transmitted from the wind-turbine control systems 22 corresponding to the individual wind turbine generators 14 and transmits deloading amount command values indicating the read deloading amounts to the individual wind-turbine control systems 22.

The wind-turbine control systems 22 that have received the deloading amount command values control the wind turbine generators 14 so as to perform the deload operation using the deloading amounts indicated by the command values.

As described above, the central control system 16 according to the first embodiment sets the deloading amounts of the individual wind turbine generators 14 on the basis of rotor speeds measured by the wind-turbine control systems 22. In other words, the deloading amounts are not set uniformly for the plurality of wind turbine generators 14 provided in the wind farm 10 but are set for the individual wind turbine generators 14 depending on increase and decrease in the rotor speeds of the individual wind turbine generators 14. This allows the central control system 16 to prevent the wind turbine generators 14 from being disconnected due to changes in wind conditions even if the wind turbine generators 14 are operated to limit the power output.

Furthermore, the central control system 16 sets the deloading amount of each wind turbine generator 14 so that the lower the rotor speed, the smaller the deloading amount is. This can therefore prevent the rotor speed from becoming excessively low due to deload operation to thereby prevent the wind turbine generators 14 from being disconnected. On the other hand, since the higher the rotor speed, the larger deloading amount the central control system 16 sets, the amount of electric power to be supplied to the utility grid 20 during PFR can be further increased.

Although the first embodiment has been described when applied to the case where the central control system 16 sets the deloading amounts depending on the rotor speeds of the individual wind turbine generators 14, the present invention is not limited thereto; the deloading amounts may be set using physical quantities related to increase and decrease in the power outputs of the wind turbine generators. For example, the central control system 16 may either set the deloading amounts depending on the wind speeds of the individual wind turbine generators 14, as shown in the schematic diagram of tabular data in FIG. 3B, or may set the deloading amounts depending on the rotor speeds and power outputs of the individual wind turbine generators 14, as shown in the schematic diagram of tabular data in FIG. 3C.

Alternatively, the central control system 16 may store functions for calculating deloading amounts depending on rotor speeds or the like without using the tabular data and may set the deloading amounts of the individual wind turbine generators 14 using the functions.

Second Embodiment

A second embodiment of the present invention will be described hereinbelow.

Since the configuration of the wind farm 10 according to the second embodiment is the same as the configuration of the wind farm 10 according to the first embodiment shown in FIG. 1, a description thereof will be omitted.

When a disturbance in the utility grid 20 has occurred, the wind turbine generator 14 according to the second embodiment is controlled using inertial energy (inertia) stored in the rotor 12 of the wind turbine generator 14 as electric power to be supplied to the utility grid 20 (inertia control) at the occurrence of a disturbance on the basis of an instruction from the wind-turbine control system 22.

Since the inertia control uses inertial energy stored in the rotor 12 to generate electric power, the wind turbine generator 14 can supply more electric power to the utility grid 20 than by normal operation. Thus, the central control system 16 according to the second embodiment sets, in addition to the deloading amounts, power outputs obtained by inertia control of the individual wind turbine generators 14 (hereinafter referred to as "the amount of inertia used") for each of the wind turbine generators 14 that constitute the wind farm 10. The central control system 16 transmits command values indicating the set amounts of inertia used to the individual wind-turbine control systems 22.

Figure 4:
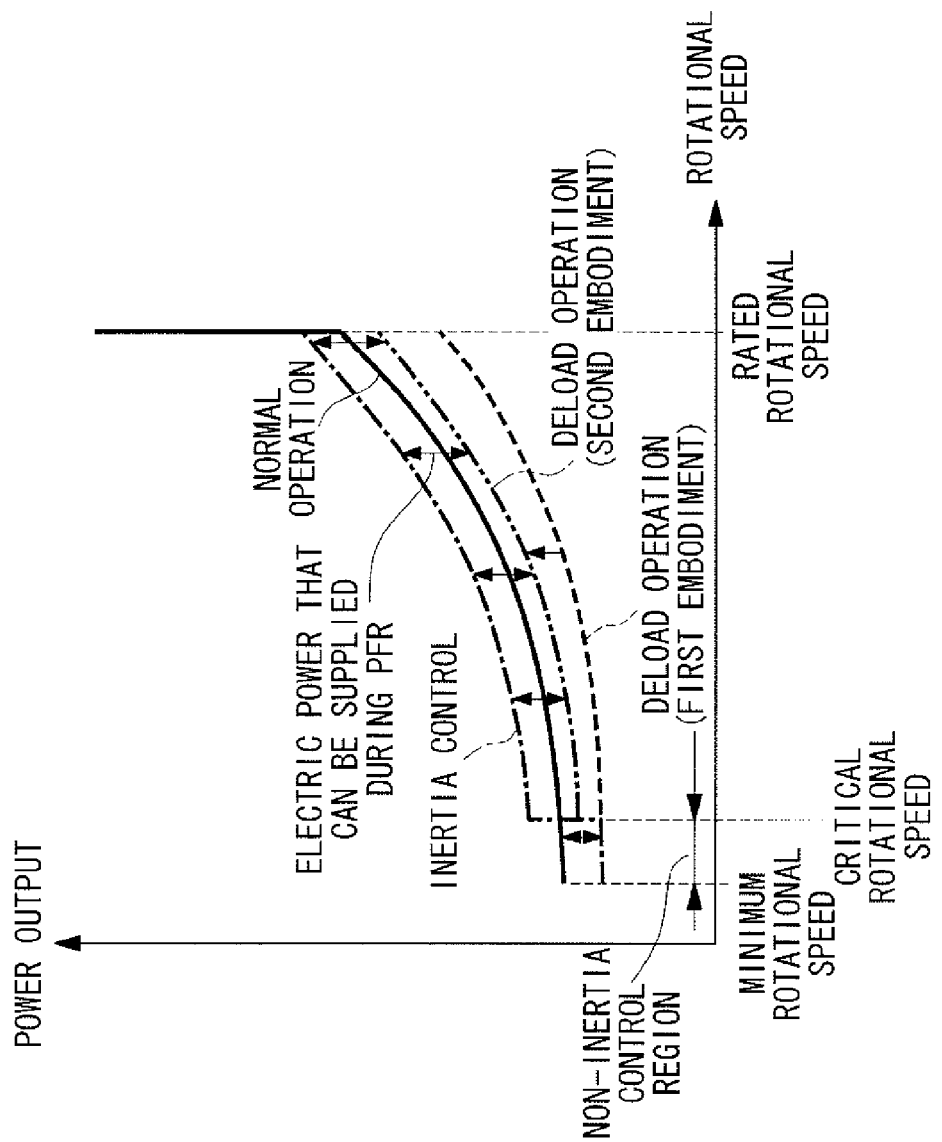
FIG. 4 is a graph showing the relationship among the rotor speed, the deloading amount, and the amount of inertia used according to a second embodiment of the present invention.

FIG. 4 shows the relationship among the rotor speed, the deloading amount, and the amount of inertia used according to the second embodiment.

In FIG. 4, the one-dot chain line indicates the upper limit of the power output of the wind turbine generator 14 in the case where the inertia control is performed, and the two-dot chain line indicates the power output of the wind turbine generator 14 in the case where the deload operation according to the second embodiment is performed. The solid line indicates the power output of the wind turbine generator 14 in the case where a normal operation is performed, and the broken line indicates the power output of the wind turbine generator 14 in the case where the deload operation according to the first embodiment is performed.

The inertia control shown in FIG. 4 allows the wind turbine generator 14 to output a constant amount of inertia used irrespective of the level of the rotor speed.

Therefore, the central control system 16 sets the deloading amount to be small as compared with a case where the inertia control is not performed depending on the amount of inertia used. In other words, the sum of the deloading amount in the first embodiment and the amount of inertia used is set as the deloading amount according to the second embodiment. Therefore, the difference between the one-dot chain line and the two-dot chain line in FIG. 4 is a power output to be further supplied to the utility grid 20 during PFR.

Thus, even if the wind turbine generator 14 is in the deload operation, more electric power can be supplied to the utility grid, and electric power to be supplied to the utility grid 20 during PFR can be ensured.

The deloading amount according to the second embodiment may not necessarily be obtained by adding the same amount as the amount of inertia used to the deloading amount according to the first embodiment and may be obtained by adding an amount smaller than the amount of inertia used; for example, adding one half of the amount of inertia used.

Since execution of the inertia control causes lose of the inertial energy of the rotor 12, the rotor speed decreases in the case where the inertia control is performed. Therefore, in the case where the rotor speed before the execution of the inertia control is low, the rotor speed becomes lower than the minimum rotational speed when the inertia control is performed, thus posing the possibility of disconnecting the wind turbine generator 14.

Thus, in the second embodiment, the level of the rotor speed at which disconnection may occur when the inertia control is performed is preset as a critical rotational speed by the central control system 16, and in the case where the rotor speed of the wind turbine generator 14 is below the critical rotational speed (the non-inertia control region in FIG. 4), the wind-turbine control system 22 does not permit the wind turbine generator 14 to perform the inertia control even if a disturbance in the utility grid 20 has occurred. Therefore, the amount of inertia used is not added to a deloading amount for rotor speeds below the critical rotational speed. That is, it is the same as the deloading amount according to the first embodiment in which no inertia control is performed.

Since the larger the amount of inertia used, the higher the degree of decrease in rotor speed due to execution of the inertia control, it is preferable that the critical rotational speed be set to differ depending on the amount of inertia used.

Figure 5:
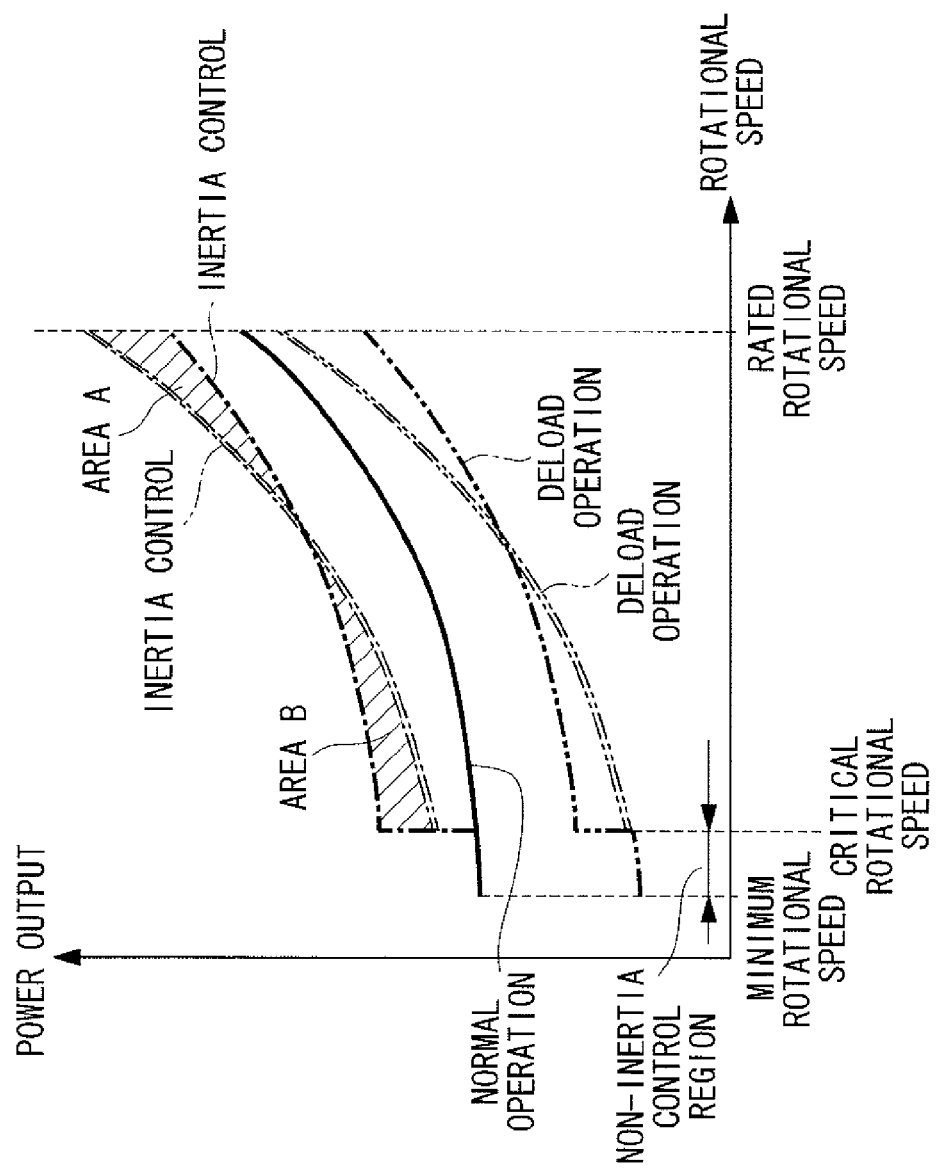
FIG. 5 is a graph showing a modification of the relationship among the rotor speed, the deloading amount, and the amount of inertia used according to the second embodiment of the present invention.

To prevent disconnection of the wind turbine generator 14 due to execution of the inertia control more reliably, the relationship among the rotor speed, the deloading amount (double two-dot chain line), and the amount of inertia used (double chain line) may be set as shown in FIG. 5.

The smaller the amount of inertia used, the lower the degree of decrease in rotor speed due to execution of the inertia control is. Therefore, the central control system 16 sets the amount of inertia used to decrease as the rotor speed decreases, as indicated by the double two-dot chain line in FIG. 5, so that the rotor speed is lower than the minimum rotational speed, thereby preventing disconnection of the wind turbine generator 14.

Furthermore, as shown in FIG. 5, the central control system 16 sets the deloading amount depending on the amount of inertia used so that constant electric power can be supplied to the utility grid 20 when a disturbance in the utility grid 20 has occurred.

In other words, the central control system 16 performs the setting, for each of the wind turbine generators 14, so that the lower the rotor speed, the smaller the amount of inertia used is and the larger the deloading amount is, and the higher the rotor speed, the larger the amount of inertia used is, and the smaller the deloading amount is.

Furthermore, it is preferable that the amount of inertia used be set so that the area of the difference between the double two-dot chain line and the two-dot chain line is 0 (zero) to keep the entire amount of inertia used constant.

That is, it is preferable that the area A of a difference at a higher rotor speed and the area B of a difference at a lower rotor speed with reference to the intersection of the double two-dot chain line and the two-dot chain line be the same.

Furthermore, the plurality of wind turbine generators 14 that constitute the wind farm 10 do not always uniformly operate throughout the range of rotor speed; for example, in the case where the wind speed of the entire wind farm 10 is low, all the wind turbine generators 14 operate in a low rotor speed region.

Figure 6:
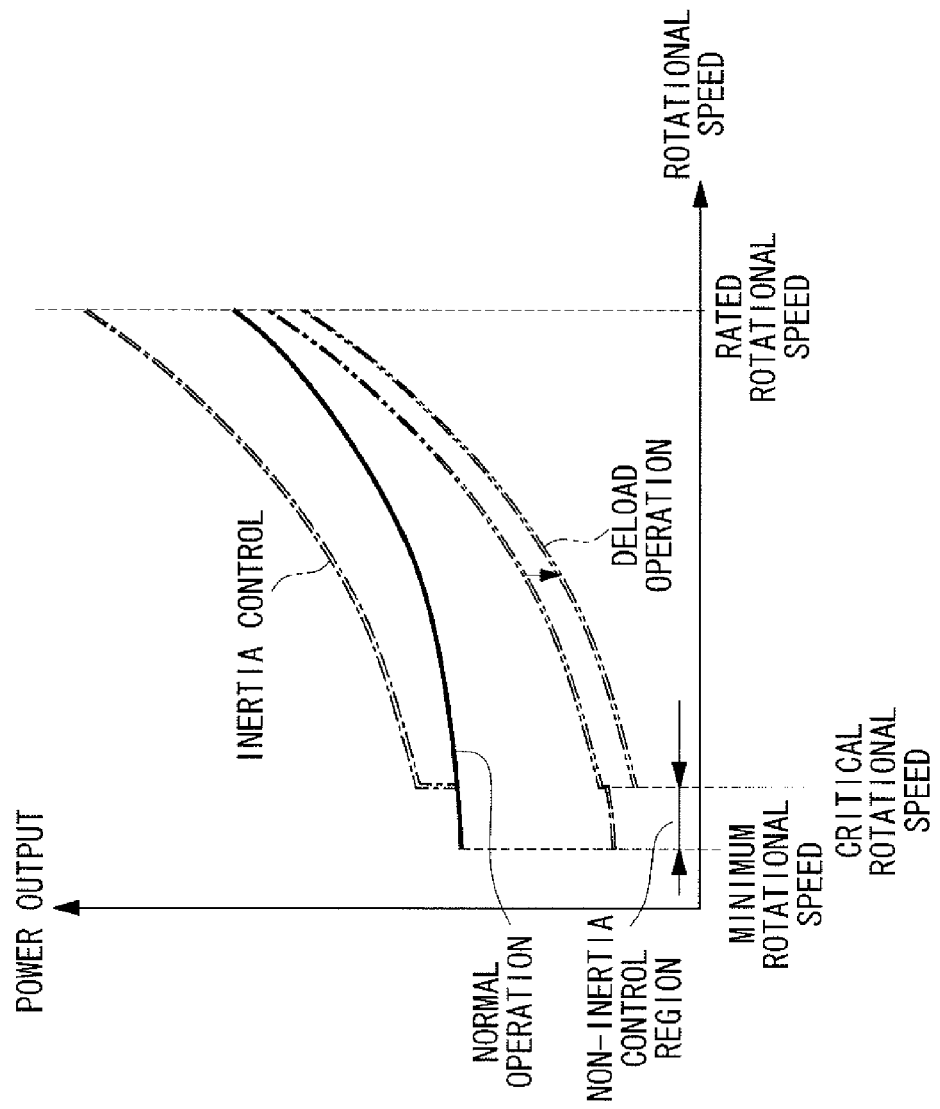
FIG. 6 is a graph showing a modification of the relationship among the rotor speed, the deloading amount, and the amount of inertia used according to the second embodiment of the present invention.

This raises the possibility that the amount of electric power for supporting the PFR of the entire wind farm 10 (hereinafter referred to as "PFR amount") falls short. Thus, it is preferable that the central control system 16 detect (monitor the PFR amount of the entire wind farm 10 at predetermined time intervals (for example, every minute), and if the PFR amount is short, lower an operation curve indicating the deloading amount (the double two-dot chain line in FIG. 6) by multiplying the operation curve by a coefficient less than or equal to 1 to increase the deloading amount to keep the total deloading amount of the plurality of wind turbine generators 14 constant irrespective of wind speed, thereby ensuring the PFR amount more reliably. This allows the wind farm 10 to restore the frequency of the utility grid 20 from a decrease more reliably.

In the case where the wind speed is high and the deloading amount is large, an unnecessary deloading amount may be reduced by multiplying the operation curve by a coefficient greater than or equal to 1 to reduce the total deloading amount to thereby increase the power output of the wind farm 10 in the case where no disturbance has occurred in the utility grid 20.

As described above, since the central control system 16 according to the second embodiment sets, for each of the wind turbine generators 14 in which inertia control is possible, the deloading amount to be small, depending on the amount of inertia used, as compared with a case where the inertial energy of the rotor 12 is not used, the power output of the wind turbine generators 14 in the case where no disturbance has occurred in the utility grid can be further increased.

The central control system 16 performs the setting, for each of the wind turbine generators 14, so that the smaller the rotor speed, the smaller the amount of inertia used is and the larger the deloading amount is, and the higher the rotor speed, the larger the amount of inertia used is, and the smaller the deloading amount is. Thus, the central control system 16 can prevent the wind turbine generator 14 from being disconnected because the rotor speed decreases too much due to execution of inertia control and can hold electric power that can be supplied to the utility grid 20 constant in the case where the frequency of the utility grid 20 has decreased irrespective of the level of the rotor speed.

Although the present invention has been described using the foregoing embodiments, the technical scope of the present invention is not limited to the scope of the foregoing embodiments. Various changes and modifications can be made to the foregoing embodiments without departing from the spirit of the present invention, and the changed or modified configurations are also included in the technical scope of the present invention.

For example, the foregoing embodiments have been described when applied to the case where, when the frequency of the utility grid 20 has decreased due to a disturbance in the utility grid 20, electric power is further supplied from the wind turbine generators 14 to the utility grid 20; however, the present invention is not limited thereto and may have a configuration in which, when the voltage of the utility grid 20 has decreased due to the occurrence of a disturbance in the utility grid 20, electric power is further supplied from the wind turbine generators 14 to the utility grid 20.

Figure 7:
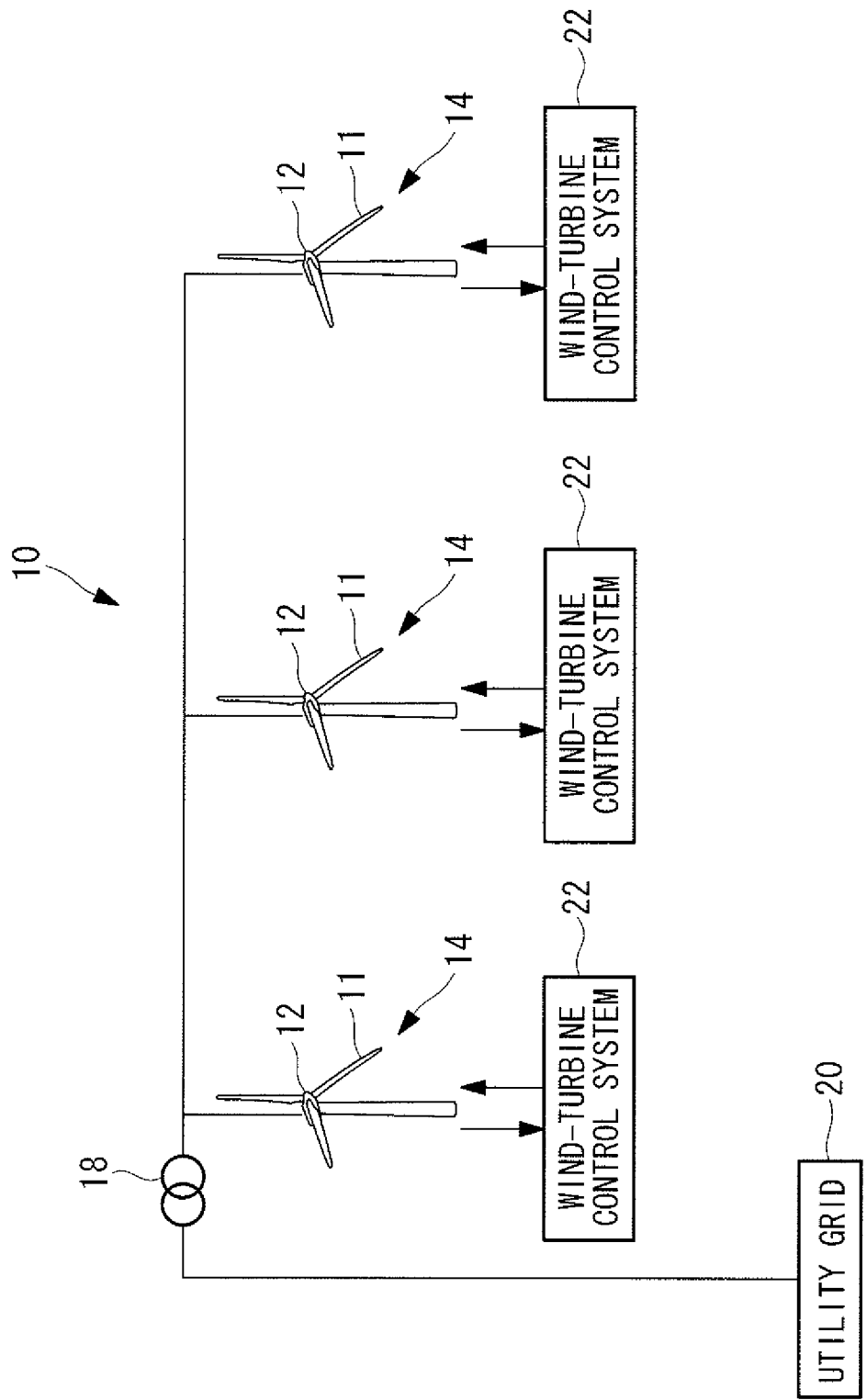
FIG. 7 is a schematic diagram showing the overall configuration of a wind farm according to another embodiment of the present invention.

The foregoing embodiments have been described when applied to the case where the central control system 16 sets the deloading amount or the amount of inertia used by each wind turbine generator 14; however, the present invention is not limited thereto and may have a configuration in which, as shown in FIG. 7, the wind-turbine control systems 22 each store tabular data, and the wind-turbine control systems 22 each set the deloading amount or the amount of inertia used on the basis of the tabular data, a wind speed of the corresponding wind turbine generator 14, and the operating state (rotor speed, power output, etc.) of the corresponding wind turbine generator 14.

Figure 8:
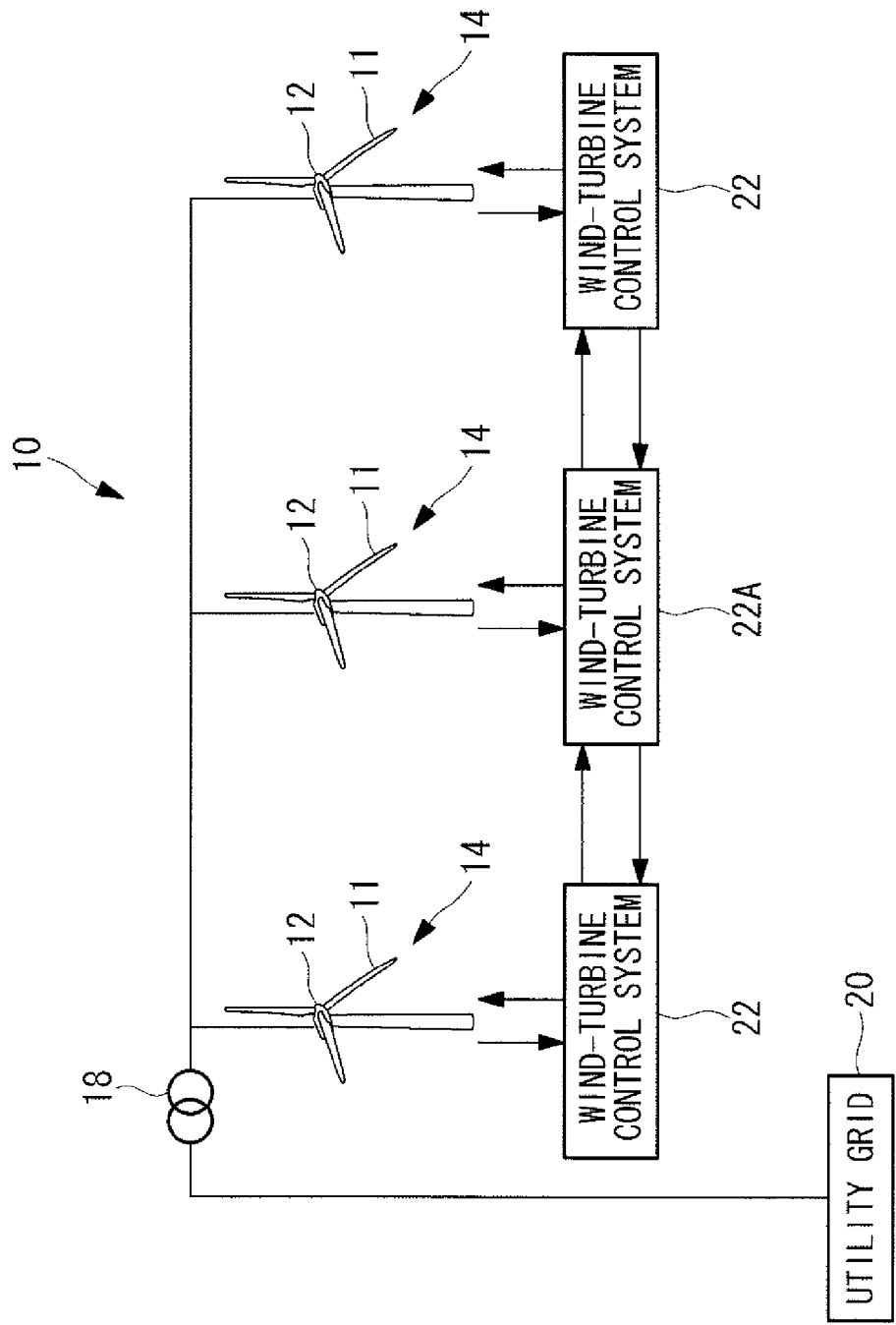
FIG. 8 is a schematic diagram showing the overall configuration of a wind farm according to another embodiment of the present invention.
Figure 9:
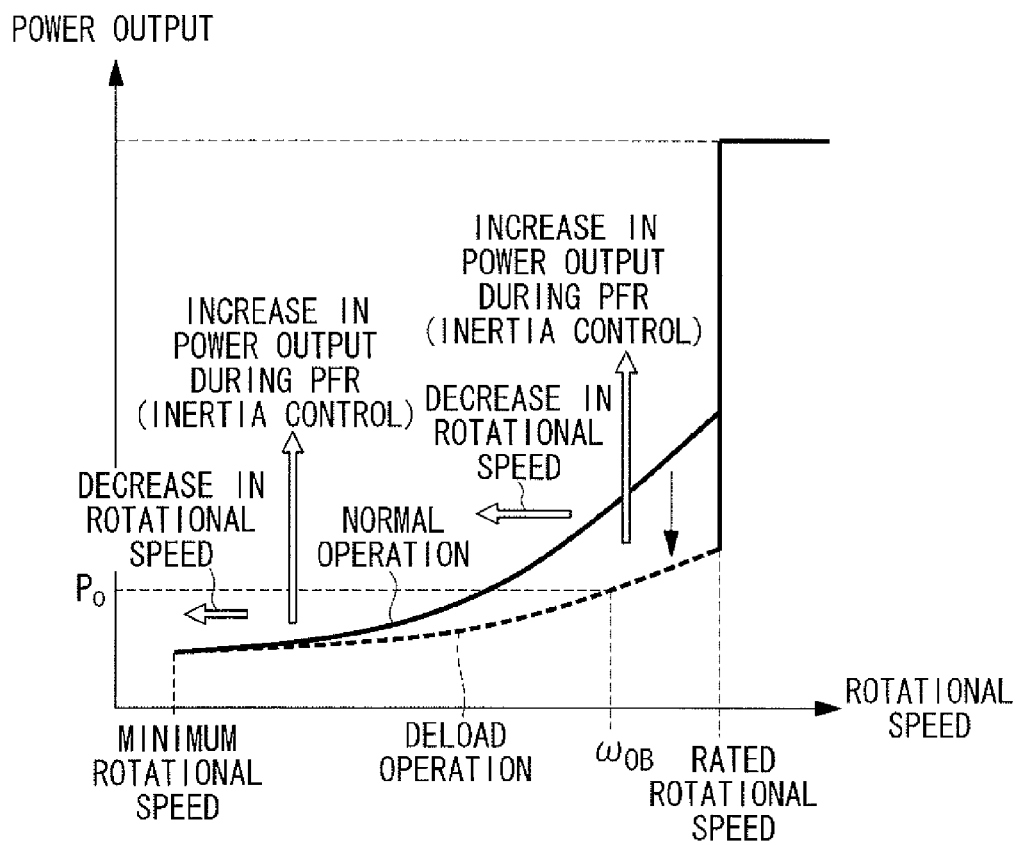
FIG. 9 is a diagram required to explain problems in the related art.

Furthermore, as shown in FIG. 8, the present invention may have a configuration in which among the plurality of wind-turbine control systems 22, a predetermined wind-turbine control system 22 (hereinafter referred to as "main wind-turbine control system 22A") stores tabular data, receives data, such as the rotor speeds of the individual wind turbine generators 14, from the other wind-turbine control systems 22, and sets the deloading amount or the amount of inertia used by the wind turbine generator 14 corresponding to itself or the wind turbine generators 14 corresponding to the other wind-turbine control systems 22.

Alternatively, the present invention may have a configuration in which the plurality of wind turbine generators 14 that constitute the wind farm 10 are divided into a plurality of groups, and the main wind-turbine control system 22 is determined for each group.

Examples of the way of grouping include grouping depending on the placement position of the wind turbine generators 14 and grouping by wind turbine generators 14 in which the average wind speed, rotor speed, and power output in a specified period are close to one another or by wind turbine generators 14 having the same feeder. The main wind-turbine control system 22A sets the deloading amount or the amount of inertia used by the wind turbine generator 14 corresponding to itself and the other wind turbine generators 14 in the group to which itself belongs.

Alternatively, the present invention may have a configuration in which, for the PFR support of the wind turbine generators 14, electric power to be supplied to the utility grid 20 is further increased by shutting off electric power to be supplied to auxiliary machines provided in the wind turbine generators 14. In this configuration, examples of the auxiliary machines for which electric power is shut off include a cooling fan and a cooling water pump, which consume relatively large electric power as compared with other auxiliary machines and whose time constants of influences of the shut-off are long so that there is no problem even if they are temporarily stopped.

Furthermore, in the case where the wind turbine generator 14 has received a request to further supply electric power to the utility grid 20 to support PFR in a state in which it is operated at a higher state than a rated wind speed (rated output), the wind-turbine control system 22 may operate the wind turbine generator 14 under overload to further supply electric power to the utility grid 20. However, the wind-turbine control system 22 monitors data that affects the performance and life of the equipment, such as the overload operating time, increases in temperature of the components, and the number of times of overload operation of the wind turbine generator 14, and if they exceed limit values, the wind-turbine control system 22 stops the overload operation.

Furthermore, to prevent disconnection of the corresponding wind turbine generator 14, the wind-turbine control system 22 determines whether to make the corresponding wind turbine generator 14 support PFR depending on the wind conditions of the wind farm 10 and the operating state of the wind turbine generator 14. For example, when the speed or acceleration of the rotor 12 of the corresponding wind turbine generator 14 falls below a limit value, the wind-turbine control system 22 ends the support for PFR and moves it to the normal operation.

REFERENCE SIGNS LIST 10 wind farm
12 rotor
14 wind turbine generator
16 central control system
20 utility grid
22 wind-turbine control system

The invention claimed is:

1. A wind farm control system including a plurality of wind turbine generators that generate electric power by rotation of rotors, in which the wind turbine generators are interconnected and are operated while power outputs thereof are limited in advance so as to be able to further supply electric power to a utility grid in response to a decrease in the frequency or voltage of the utility grid, the wind farm control system comprising:
   a measuring portion that measures, for each of the wind turbine generators, a physical quantity related to increase and decrease in the power output of the corresponding wind turbine generator; and
   a setting portion that sets, for each of the wind turbine generators, a limitation amount of the power output of the corresponding wind turbine generator on the basis of the physical quantity measured by the measuring portion, wherein the setting portion sets the limitation amount of the power output of each wind turbine generator so that the larger the physical quantity measured by the measuring portion, the larger the limitation amount of the power output, and the smaller the physical quantity measured by the measuring portion, the smaller the limitation amount of the power output.

2. A wind farm control system including a plurality of wind turbine generators that generate electric power by rotation of rotors, in which the wind turbine generators are interconnected and are operated while power outputs thereof are limited in advance so as to be able to further supply electric power to a utility grid in response to a decrease in the frequency or voltage of the utility grid, the wind farm control system comprising:
   a measuring portion that measures, for each of the wind turbine generators, a physical quantity related to increase and decrease in the power output of the corresponding wind turbine generator; and
   a setting portion that sets, for each of the wind turbine generators, a limitation amount of the power output of the corresponding wind turbine generator on the basis of the physical quantity measured by the measuring portion, wherein:
   the wind turbine generators are controlled so that, when the utility grid decreases in frequency or voltage, the wind turbine generators further supply electric power to the utility grid by using inertial energy of the rotors; and
   the setting portion sets, for each of the wind turbine generators, the limitation amount of the power output so as to be small as compared with a case in which the inertial energy of the corresponding rotor is not used, depending on the power output obtained by the inertial energy of the rotor.

3. The wind farm control system according to claim 2, wherein the setting portion performs the setting, for each of the wind turbine generators, so that the smaller the physical quantity measured by the measuring portion, the smaller the inertial energy that is used when the utility grid decreases in frequency or voltage is and the larger the limitation amount of the power output is, and the larger the physical quantity measured by the measuring portion, the larger the inertial energy that is used when the utility grid decreases in frequency or voltage is and the smaller the limitation amount of the power output is.

4. The wind farm control system according to claim 2, wherein the setting portion sets the rotational speed of the rotor in advance on which the control for further supplying electric power to the utility grid using the inertial energy is not performed even if the utility grid decreases in frequency or voltage.

5. The wind farm control system according to claim 1, wherein the setting portion sets the total limitation amount of the power outputs of the plurality of wind turbine generators to be kept constant irrespective of a wind speed of the wind turbine generators.

6. A wind farm comprising:
   a plurality of wind turbine generators; and
   the wind farm control system according to claim 1.

7. A wind farm control method including a plurality of wind turbine generators that generate electric power by rotation of rotors, in which the wind turbine generators are interconnected and are operated while power outputs thereof are limited in advance so as to be able to further supply electric power to a utility grid in response to a decrease in the frequency or voltage of the utility grid, the wind farm control method comprising:
   a first process of measuring, for each of the wind turbine generators, a physical quantity related to increase and decrease in the power output of the corresponding wind turbine generator; and
   a second process of setting, for each of the wind turbine generators, a limitation amount of the power output of the corresponding wind turbine generator on the basis of the physical quantity measured in the first process,
   wherein in the second process, the limitation amount of the power output of each of the wind turbine generators is set so that the larger physical quantity measured in the first process, the larger the limitation amount of the power output, and the smaller the physical quantity measured in the first process, the smaller the limitation amount of the power output.

8. A wind farm control method including a plurality of wind turbine generators that generate electric power by rotation of rotors, in which the wind turbine generators are interconnected and are operated while power outputs thereof are limited in advance so as to be able to further supply electric power to a utility grid in response to a decrease in the frequency or voltage of the utility grid, the wind farm control method comprising:
   a first process of measuring, for each of the wind turbine generators, a physical quantity related to increase and decrease in the power output of the corresponding wind turbine generator; and
   a second process of setting, for each of the wind turbine generators, a limitation amount of the power output of the corresponding wind turbine generator on the basis of the physical quantity measured in the first process,
   wherein the wind turbine generators are controlled so that, when the utility grid decreases in frequency or voltage, the wind turbine generators further supply electric power to the utility grid by using inertial energy of the rotors; and
   in the second process, for each of the wind turbine generators, the limitation amount of the power output is set so as to be smaller as compared to when the inertial energy of the corresponding rotor is not used, depending on the power output obtained by the inertial energy of the rotor.

9. The wind farm control system according to claim 2, wherein the setting portion sets the total limitation amount of the power outputs of the plurality of wind turbine generators to be kept constant irrespective of a wind speed of the wind turbine generators.

10. A wind farm comprising:
a plurality of wind turbine generators; and
the wind farm control system according to claim 2.

11. The wind farm control method of claim 8, wherein, in the second process, for each of the wind turbine generators, the limitation amount of the power output is set so as to be small as compared to when the inertial energy of the corresponding rotor is not used, depending on the power output obtained by the inertial energy of the rotor.

* * * * *